US012719794B2

(12) United States Patent
Shachar et al.

(10) Patent No.: US 12,719,794 B2
(45) Date of Patent: Aug. 25, 2026

(54) DYNAMIC TELEMETRY OPTIMIZATION

(71) Applicant: Dell Products L.P., Round Rock, TX (US)

(72) Inventors: Tomer Shachar, Beer-Sheva (IL); Ophir Buchman, Raanana (IL); Yevgeni Gehtman, Modi'in (IL)

(73) Assignee: DELL PRODUCTS L.P., Round Rock, TX (US)

( * ) Notice: Subject to any disclaimer, the term of this patent is extended or adjusted under 35 U.S.C. 154(b) by 317 days.

(21) Appl. No.: 18/655,536

(22) Filed: May 6, 2024

(65) Prior Publication Data

US 2025/0343758 A1 Nov. 6, 2025

(51) Int. Cl.
*H04L 47/12* (2022.01)
*H04Q 9/00* (2006.01)

(52) U.S. Cl.
CPC ............... *H04L 47/12* (2013.01); *H04Q 9/00* (2013.01)

(58) Field of Classification Search
CPC .................................. H04L 47/12; H04Q 9/00
See application file for complete search history.

(56) References Cited

U.S. PATENT DOCUMENTS 10,862,807 B2 * 12/2020 Vytla .................. H04L 41/0894
11,323,305 B1 * 5/2022 Liu .................... H04L 41/0645
11,848,837 B2 * 12/2023 Levy .................... H04L 67/025
12,455,483 B2 * 10/2025 Vollen .................... H04L 67/12
2014/0214685 A1 * 7/2014 Le Buhan ............. G01D 4/002 705/63
2019/0391833 A1 * 12/2019 Muramatti ............. H04L 43/20
2020/0136973 A1 * 4/2020 Rahman ................ G06N 20/00
2022/0174012 A1 * 6/2022 Deshmukh .......... H04L 67/1097
2023/0388206 A1 * 11/2023 Sandhaus ............. H04L 43/067
2023/0401112 A1 * 12/2023 Hofmann ............ G06F 11/0736
2024/0005777 A1 * 1/2024 Doshi .................... G08C 15/06
2024/0073118 A1 * 2/2024 Gafni ................. H04L 41/5009
2025/0097129 A1 * 3/2025 Dror .................... H04L 43/065

* cited by examiner

*Primary Examiner* — Amine Benlagsir

(74) *Attorney, Agent, or Firm* — Amin, Turocy & Watson, LLP

(57) ABSTRACT

Architectures and techniques are described that can iteratively and dynamically offset telemetry data instances across reporting periods in order to reduce traffic spikes caused by the reporting of telemetry data by remote devices. The disclosed techniques can identify a cycle period indicative of a reporting frequency of a remote device, which can be composed of numerous intervals indicative of an amount of time (or another resource) is utilized to process the telemetry instance. The disclosed techniques can further determine an equal distribution value that represents a target value for a number of telemetry instances to be received per interval. Based on the EDV, various telemetry instances can be offset by an offset amount in order to effectuate a more even distribution of the telemetry traffic.

20 Claims, 12 Drawing Sheets

300A

300B

DYNAMIC TELEMETRY OPTIMIZATION

BACKGROUND

Today, telemetry data is becoming an increasingly important aspect for succeeding in the marketplace. Generally, telemetry refers to the automated process of collecting and transmitting data from remote or inaccessible sources to a central location for monitoring, analysis, and decision-making. Often, telemetry data involves the use of sensors, instruments, or monitoring devices to capture data related to various states, configuration parameters, or metrics of a device, or the behavior of the device or an associated user. Businesses use telemetry data in a wide range of applications across different industries to gather insights, improve operational efficiency, enhance product performance, and make data-driven decisions. Hence, a business that markets virtually any device will program that device to periodically send telemetry and/or analytical data back to an authorized telemetry system for monitoring, analysis, and so forth.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
FIG. 1 shows a schematic block diagram illustrating telemetry data being transmitted to a telemetry system in accordance with certain embodiments of this disclosure.
Figure 1:
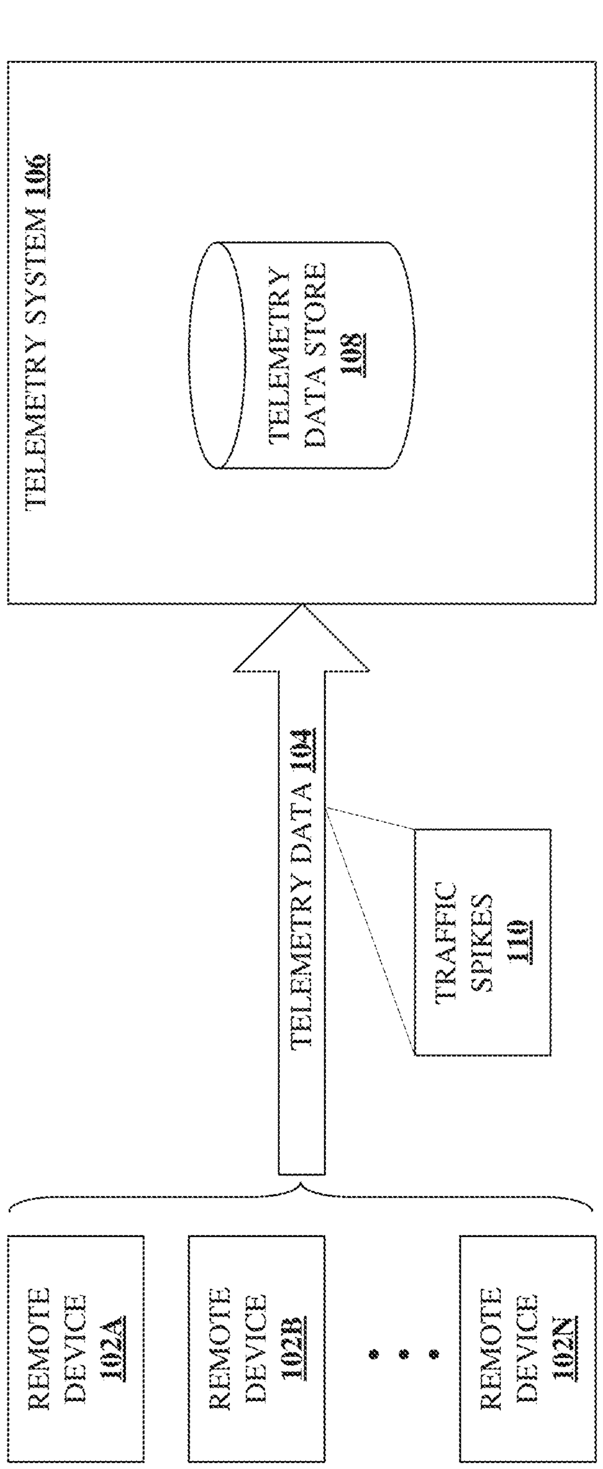

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

To provide additional context, consider FIG. 1. FIG. 1 shows a schematic block diagram 100 illustrating telemetry data being transmitted to a telemetry system in accordance with certain embodiments of this disclosure.

As illustrated, remote devices 102, which can be any number of remote devices 102A-102N, where N is a whole number, can transmit telemetry data 104 to telemetry system 106. Examples of remote devices 102 can be consumer electronic devices (e.g., smartphones, appliances, fitness devices or other wearable devices, and so on), vehicle telematics systems, industrial sensors, environmental sensors, medical devices, Internet-of-things (IoT) devices, network devices, and so on. Remote device 102 can be any of the above examples or any other suitable type of telematic device that sends telemetry data 104 to telemetry system 106, which can comprise telemetry data store 108.

Telemetry system 106 can be a back office data warehouse or can be a cloud based system. A back office data warehouse typically relates to central data storage server(s) and associated network infrastructure that is managed on-site by a business (e.g., one that sells remote devices 102). A cloud based system typically relates to cloud-based processing and storage that is typically offered as a service by a third party (e.g., a data services entity).

As indicated in the background section, telemetry data 104 involves the use of sensors, instruments, or monitoring devices (hereinafter referred to as remote device(s) 102) to capture data related to various states, parameters, or metrics of a device or the behavior of the device or an associated user. As telemetry data 104 is becoming increasingly important to businesses, telemetry systems 106, whether back office data warehouses or cloud based systems, often encounter a significant challenge in the form of traffic spikes 110.

Traffic spike 110 relates to an (often unexpected) overload or congestion condition in telemetry system 106 servers due to the influx of telemetry data 104 transmitted from remote devices 102, particularly when many individual remote devices transmit telemetry data 104 as overlapping times. Such can lead to performance bottlenecks, server strain, and can even result in telemetry data 104 being lost. Existing telemetry systems 106 do not manage and process incoming data streams of telemetry data 104 in an efficient manner for a variety of reasons.

Chief among these reasons is that telemetry data 104 is commonly transmitted via a one-way communication channel, so changing a reporting schedule of a given remote device 102 can be challenging to manage. Further, remote devices 102 are frequently installed and configured in the field at similar times. Hence, a default reporting schedule (e.g., once per week beginning at the time of configuration) can have considerable overlap with reporting schedules for other remote devices 102.

Current approaches deal with traffic spikes 110 essentially by attempting to provide the resources necessary to accommodate the peaks. For back office data warehouses, such means building out the server and network infrastructure to handle peak traffic spikes 110. In the case of cloud based systems, the telemetry data 104 owner is essentially placing trust in the cloud provider's auto-scaling and load-balancing systems. In either case, these approaches are less efficient and/or less cost-effective than having a stable telemetry data 104 load that can be adequately handled by significantly less server and network infrastructure than is required to handle peak traffic spikes 110.

Accordingly, the disclosed subject matter, in some embodiments, is directed to improving or optimizing telemetry data transfer from remote devices (e.g., remote devices 102) to telemetry systems (e.g., telemetry system 106), which can effectively reduce the burden on servers. Furthermore, the disclosed techniques can leverage an adaptive mechanism that can intelligently distribute data traffic across time, resulting in more efficient and more balanced utilization of server and network resources. Such can represent a significant technological improvement to the operation of data warehouses, including cloud-based systems that receive, process, and/or store telemetry data 104.

Example Systems

Figure 2:
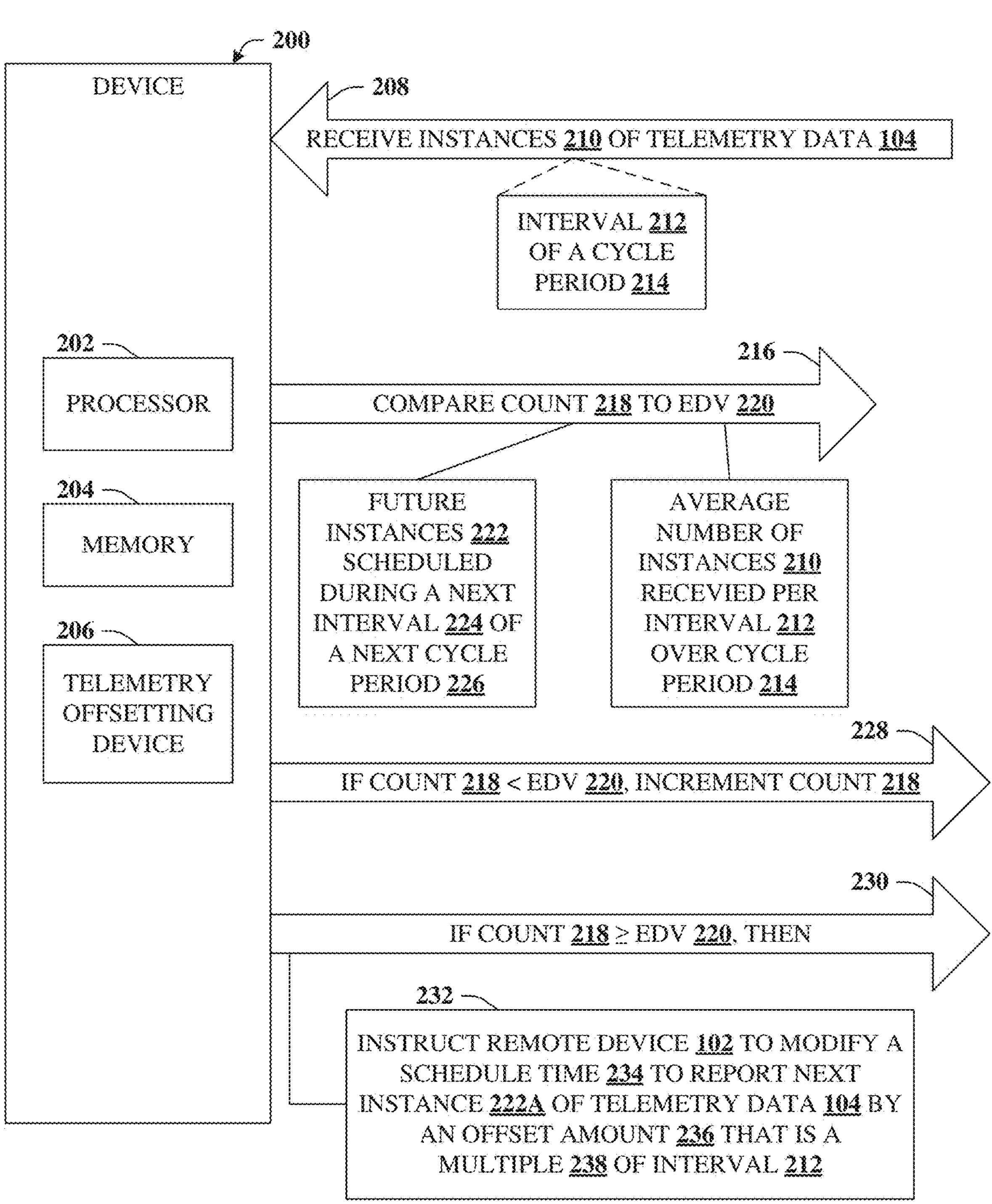
FIG. 2 depicts a schematic block diagram illustrating an example device that can dynamically offset telemetry instances to reduce telemetry traffic spikes in accordance with certain embodiments of this disclosure.

With reference now to FIG. 2, a schematic block diagram is depicted illustrating an example device 200 that can dynamically offset telemetry instances to reduce telemetry traffic spikes in accordance with certain embodiments of this disclosure. In some embodiments, device 200 can be communicatively coupled to or integrated with a telemetry system, such as telemetry system 106, that can receive, process, and/or store telemetry data, such as telemetry data 104.

Device 200 can comprise at least one processor 202 that, potentially along with telemetry offset device 206, can be specifically configured to perform functions associated with optimizing telemetry loads and/or reducing telemetry traffic spikes 110. Device 200 can also comprise at least one memory 204 that stores executable instructions that, when executed by the at least one processor 202, can facilitate performance of operations. Processor(s) 202 can be a hardware processor having structural elements known to exist in connection with processing units or circuits, with various operations of processor 202 being represented by functional elements shown in the drawings herein that can require special-purpose instructions, for example, stored in memory 204 and/or telemetry offset device 206. Along with these special-purpose instructions, processor 202 and/or telemetry offset device 206 can be a special-purpose device. Further examples of the memory 204 and processor 202 can be found with reference to FIG. 12. It is to be appreciated that device 200 or computer 1202 can represent a server device or a client device of a network or data services platform and computer 1202 can be used in connection with implementing one or more of the systems, devices, or components shown and described in connection with FIG. 2 and other figures disclosed herein.

As illustrated at reference numeral 208, device 200 can receive, from remote devices 102, a respective instance 210 of telemetry data 104 that is associated with an interval 212 of a cycle period 214. Each respective instance 210 can be referred to herein, either collectively or individually as instance 210. In some embodiments, interval 212 can be indicative of a time utilized to process a given instance 210 of telemetry data 104. Cycle period 214 can be indicative of a reporting frequency for the remote device 102 that transmits that particular instance 210 of telemetry data 104. Thus, if a given remote device 102 reports back telemetry data 104 once per week, then cycle period 214 in that case is a week. As a representative example used for the remainder of this disclosure interval 212 is one minute and cycle period 214 is one week. However, many other implementations can exist. Additional detail regarding instances 210 and cycle period 214 can be found with reference to FIGS. 3A and 3B.

Figure 3A:
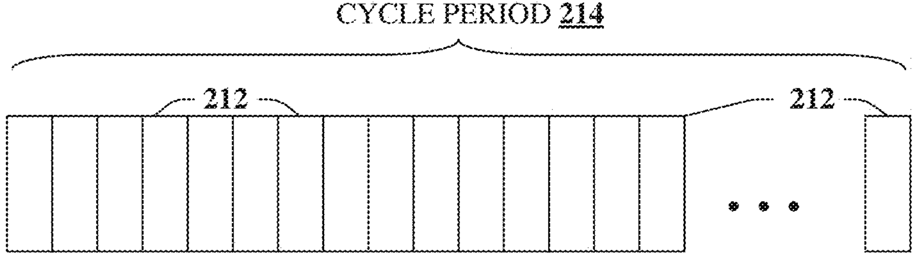
FIG. 3A depicts a schematic block diagram illustrating a conceptual representation of a given cycle period comprising multiple intervals in accordance with certain embodiments of this disclosure.
Figure 3B:
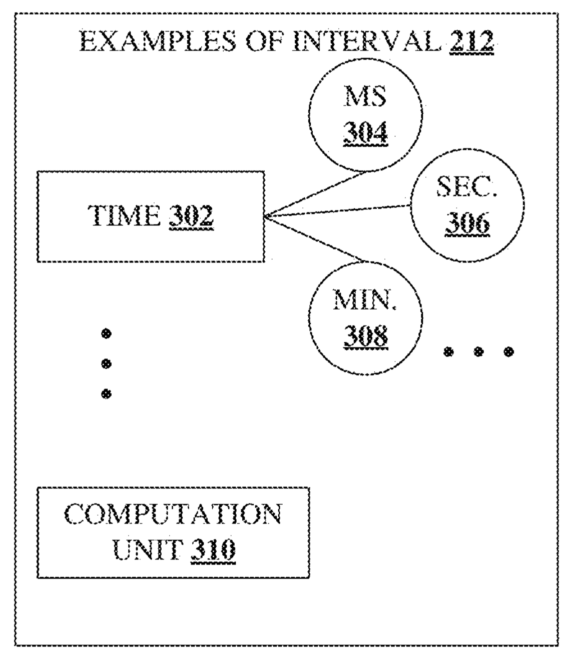
FIG. 3B depicts a schematic block diagram illustrating various example implementations of intervals and cycle periods in accordance with certain embodiments of this disclosure.
Figure 3B:
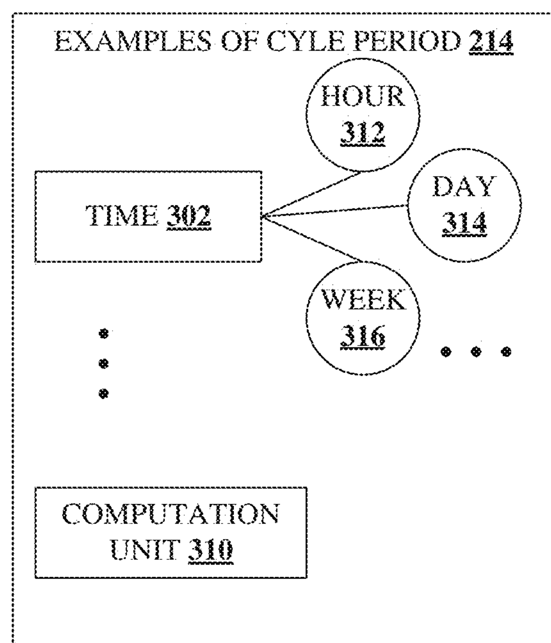

While still referring to FIG. 2, FIGS. 3A and 3B can now be referenced. FIG. 3A depicts a schematic block diagram 300A illustrating a conceptual representation of a given cycle period 214 comprising multiple intervals 212 in accordance with certain embodiments of this disclosure. Namely, cycle period 214 can comprise any suitable number of intervals 212, as depicted. In some embodiments, it is not strictly necessary that cycle period 214 is evenly divisible by intervals 212.

FIG. 3B depicts a schematic block diagram 300B illustrating various example implementations of intervals 212 and cycle periods 214 in accordance with certain embodiments of this disclosure. For instance, both interval 212 and cycle period 214 can be implemented as a function of time 302 or as a function of a computation unit 310.

By way of illustration, in the context of time 302, interval 212 can be implemented as a number of milliseconds 304, a number of seconds 306, a number of minutes 308, and so on. Similarly, in the context of time 302, cycle period 314 can be a number of hours 312, days 314, weeks, 316, and so on. Thus, as indicated above, the representative implementation used herein for illustration purposes selects interval 212 (e.g., a time utilized to process an instance 210 of telemetry data 104) as one minute 308 and the cycle period 214 (e.g., the period between which a given remote device 102 sends sequential instances 210 of telemetry data 104) is one week 316.

However, in other embodiments, computation units 310 can be used instead of time 302. In the context of computation units 310, instead of measuring intervals 212 and cycle periods 214 by time 302, associated periods or durations can be described by a number of computation units 310. By way of example, a computation unit can be a function of one or more computer processing unit (CPU) clock cycles, a function of one or more floating point operations per second (FLOPS), a function of one or more instructions per second (IPS), or another suitable computation unit that measures a computational resource. Examples of implementations or embodiments that utilize computation units 310 instead of time 302 are further detailed in connection with FIG. 4.

Still referring to FIG. 2, it is understood that during a given interval 212, only a portion of all remote devices 102 may be sending telemetry data 104, whereas other members of remote devices 102 may send respective instances 210 of telemetry data 104 during other intervals 212. However, as discussed, once instances 210 of telemetry data 104 are received during an interval 212 (e.g., indicated at reference numeral 208), a telemetry redistribution procedure can ensue.

For example, at reference numeral 216, device 200 can compare a count 218 to an equal distribution value (EDV) 220. Count 218 can be indicative of a count of future instances 222 of telemetry data 104 scheduled to be received from remote devices 102 during a next interval 224 of a next cycle period 226. In other words, count 218 can track the number of instances 210 that are scheduled to be received during a next interval 224 one week 316 in the future (e.g., after one cycle period 214).

EDV 220 can be indicative of an average number of instances 210 received per respective interval 212 over cycle period 214. For example, suppose 500,000 remote devices 102 reported respective instances 210 of telemetry data 104 during a previous cycle period 214. Since there are (7*24*60=) 10,080 minutes (e.g., intervals 212) in a week (e.g., cycle period 214), then there are approximately (500, 000/10,080) 50 instances 210 received per interval 212 on average. Thus, EDV 220 can be set to 50 in this example. As noted, 50 represents an average value, and so an optimal target for an evenly distributed telemetry data 104 traffic flow. In some embodiments, EDV 220, potentially along with interval 212 can cycle period 214, can be determined during an analysis/training period, such as by examining one or more previous cycles of telemetry data 104.

At reference numeral 228, device 200 can make a first determination about the comparison of count 218 to EDV 220. If count 218 is less than EDV, then such indicates that the number of future instances 222 scheduled during the next interval 224 one week out is less than the target, optimal value indicated by EDV 220 (e.g., 5). Therefore, it can be desirable for the future instance 222 to remain in the same time slot (e.g., next interval 224), and count 218 can be incremented.

On the other hand, as indicated at reference numeral 230, if count 218 is greater than or equal to EDV 220, such can indicate that the number of future instances 222 scheduled for the next interval 224 (e.g., one week out) is already at or above the ideal value indicated by EDV 220. Thus, as reference numeral 232, device 200 can instruct an associated remote device 102 (e.g., the remote device 102 that generated the associated instance 210) to modify a schedule time 234 to report a next instance 222A (e.g., a member of future instances 222) of telemetry data 104.

Given that communication between remote devices 102 and telemetry system 106 can be a one-way communication channel, the instruction provided by device 200 can be transmitted via an acknowledgement (ACK). In response to receiving the ACK, remote device 102 can be informed that instance 210 was received and does not need to be resent and further can be configured to identify the modification to the reporting time for the next instance 222A and update the internal state accordingly. Thus, instead of sending next instance 222A exactly one week out, next instance 222A can be scheduled to be sent one week out plus some offset amount 236 that is inserted in the ACK. Offset amount 236 can be a multiple 238 of interval 212.

In other words, offset amount 236 can be a function of interval 212. Multiple 238 can be one, two, three, or any other suitable number, although in some embodiments, detailed herein, certain constraints can be applied to the multiple 238. Further detail regarding multiple 238 as well as offset amount 236 can be found in connection with FIGS. 4 and 5, infra.

Figure 4:
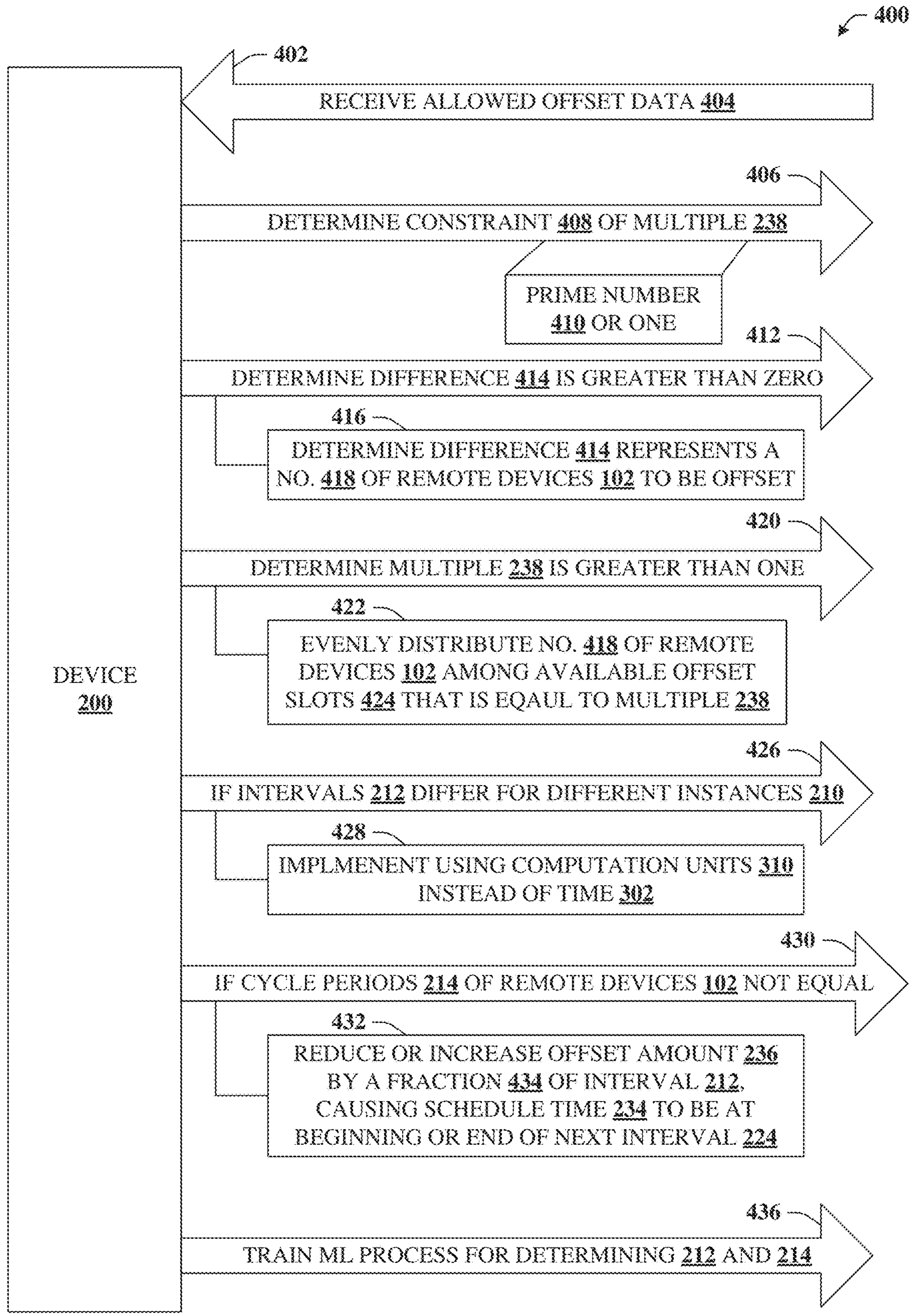
FIG. 4 depicts a schematic block diagram illustrating additional elements or aspect of the example device that can dynamically offset telemetry instances to reduce telemetry traffic spikes in accordance with certain embodiments of this disclosure.

With reference now to FIG. 4, a schematic block diagram 400 illustrating additional elements or aspect of the example device 200 that can dynamically offset telemetry instances to reduce telemetry traffic spikes in accordance with certain embodiments of this disclosure.

At reference numeral 402, device 200 can receive allowed offset data 404. Allowed offset data 404 can be indicative of a maximum value for offset amount 236. Thus, allowed offset data 404 can constrain multiple 238 (e.g., the amount of next intervals 224 available to which next instance 222A can be rescheduled). Allowed offset data 404 can exist for any number of reasons. For example, regulation may exist that directly or indirectly impacts how or when instances 210 can be transmitted. As another example, company policy might place a limit on how or when instances 210 can be transmitted. For instance, a data owner may schedule analysis workflows at a particular time and thus need to ensure that instances 210 arrive by a particular time or within a given window.

Regardless, allowed offset data 404 operates as a constraint on the operation of device 200 that is to be considered. At reference numeral 406, based on allowed offset data, device 200 can determine constraint 408 of multiple 238. As mentioned, multiple 238 can be one or another number, but in some embodiments, multiple 238 can be constrained to be a prime number 410. Given that device 200 operates by iteratively rescheduling future instances 222A over several cycle periods 214, constraining multiple 238 to be a prime number 410 can prevent certain cyclical inefficiencies. As noted, multiple 238 can also be constrained by allowed offset data 404. Hence, if allowed offset data 404 indicates that the maximum value for offset amount 236 is twelve, device 200 can determine constraint 408 such that multiple 238 is limited to eleven, which is the first prime number 410 that is less than or equal to twelve.

At reference numeral 412, device 200 can determine that difference 414 is greater than zero. Difference 414 can represent a difference between a number of instances 210 of telemetry data 104 received during a given interval 212 and EDV 220. Thus, difference 414 represents a number 418 of remote devices 102 that are to be rescheduled by some offset amount 236.

At reference numeral 420, device 200 can determine that multiple 238 is greater than one. If not, such indicates that next instance 222A can only be moved by a single interval 212 and thus can only be rescheduled to one other next interval 224. However, if multiple 238 is greater than one, then a given next instance 222A can be rescheduled to multiple available next interval 224 slots. In that case, as indicated at reference numeral 422, device 200 can evenly distribute the number 418 of remote devices 102 among available offset slots 424. The available offset slots 424 can be equal to and/or defined by multiple 238. Additional detail(s) regarding rescheduling can be found in connection with FIG. 5.

Figure 5:
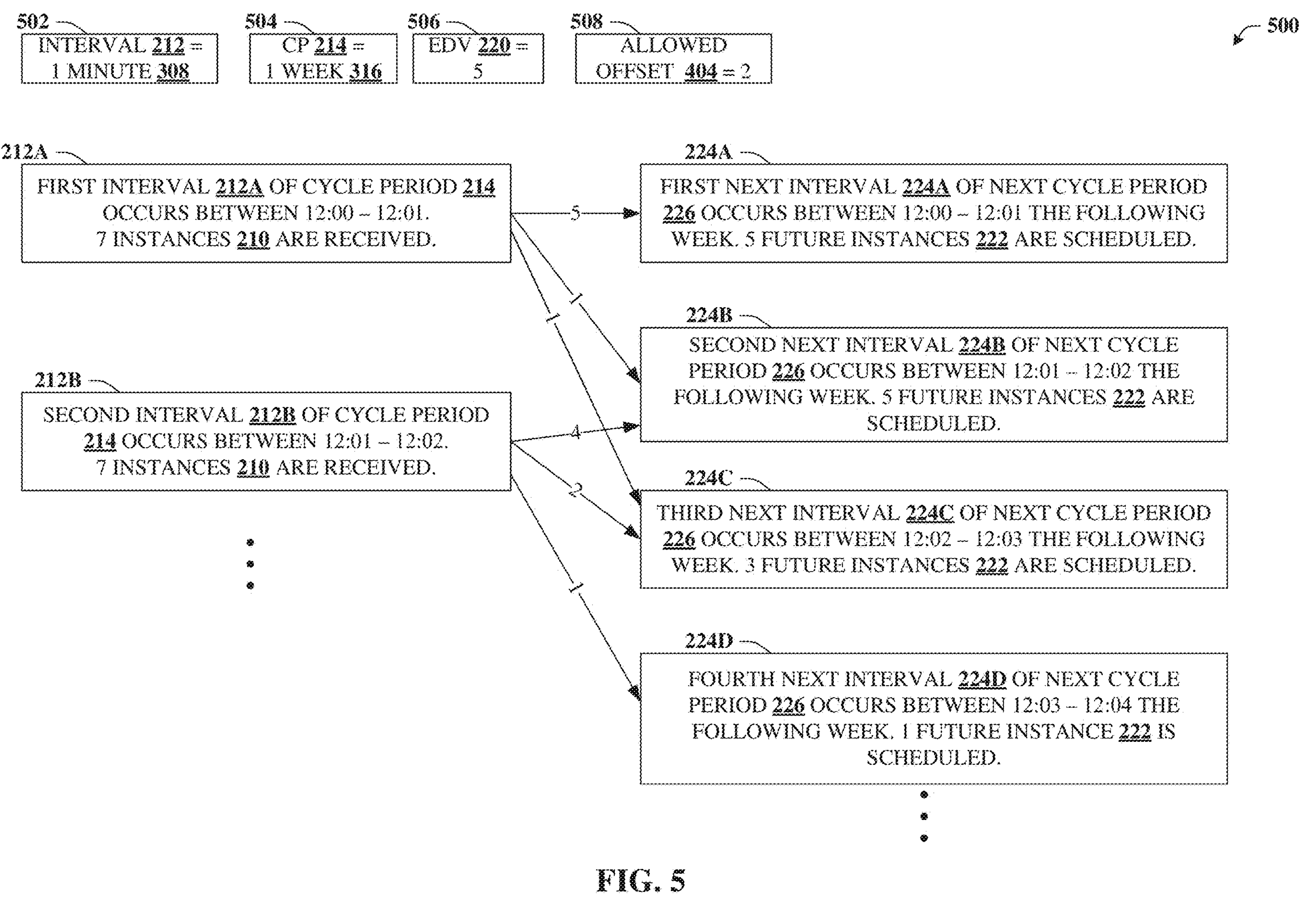
FIG. 5 depicts a schematic block diagram illustrating an example flow of an example redistribution and/or rescheduling process in accordance with certain embodiments of this disclosure.

While still referring to FIG. 4, but turning now as well to FIG. 5, a schematic block diagram 500 is depicted illustrating an example rescheduling process flow in accordance with certain embodiments of this disclosure. As indicated by reference numerals 502-508, interval 212 has been determined to be one minute 308, cycle period 214 has been determined to be one week 316, EDV 220 has been determined to be five, and allowed offset data 404 constrains the maximum allowable offset to two minutes (e.g., two intervals 212).

As indicated, first interval 212A of cycle period 214 occurs between 12:00 AM and 12:01 AM. During first interval 212A, seven instances 210 are received. Initially, when the first instance 210 of telemetry data 104 is received during first interval 212A, count 218 can be initialized to zero meaning that no future instances 222 have been scheduled for first next interval 224A of next cycle period 226 (e.g., 12:00-12:01 the following week).

Hence, the first five instances 210 received during first interval 212A do not need to be rescheduled because count 218 is less than EDV 220 (e.g., the optimal target per interval 212). But in each case, count 218 can be incremented, and thereafter, device 200 can determine that five (e.g., the current count 218) future instances 222 have been scheduled to occur during first next interval 224A.

Since seven instances 210 are received during first interval 212A, difference 414 is (7-5=) two, indicating that two future instances 222 are to be rescheduled to a different next interval 224 than first interval 224A, which already has five future instances scheduled. Given that allowed offset data 404 indicates a maximum offset of two minutes, device 200 can determine that two is a prime number 410 and therefore, multiple 238 is limited to two.

Hence, the number of available offset slots 424 can be two, meaning that if the number of instances 210 received during a given interval 210 is greater than EDV 220, the difference 414 can be evenly distributed among the two available offset slots 424 when rescheduling the respective next intervals 224. In this case, the two available offset slots 424 (e.g., within two minutes of first next interval 224A) are second next interval 224B and third next interval 224C. Since difference 414 is also two, each offset slot 424 can be allocated one of the two remaining future instances 222. Thus, associated remote devices 102 associated with the future instances 222 that were rescheduled can be instructed to modify schedule time 234 (e.g., via an ACK) by offset amount 236. The offset amount 236 in one case is one minute, while the offset amount 236 for the other case is two minutes, since the future instances 222 are to be evenly distributed among the two available offset slots 424.

During second interval 212B of cycle period 214, which occurs between 12:01 AM and 12:02 AM, another seven instances 210 are received. Initially, it is known that second next interval 224B already has one future instance 222 scheduled during this slot since one future instance 222 from first interval 212A was scheduled to second next interval 224B. Therefore, only four of the seven instances 210 received during second next interval 212B can be additionally allocated to second next interval 212B. Thus, second next interval 212B has (1+4=) five future instances 222 schedule, just as was the case for first next interval 224A.

Thus, the remote devices 102 associated with the remaining three instances 210 received during second interval 212B can be rescheduled by respective offset amount 236. For instance, remote devices 102 associated with the future instances 222 that are to be rescheduled can be instructed to modify schedule time 234 (e.g., via an ACK) by offset amount 236. The offset amount 236 for the first two cases is one minute, while the offset amount 236 for the other case is two minutes. Hence, two future instances 222 are rescheduled to third next cycle interval 224C, which occurs between 12:02 AM and 12:03 AM the following week (e.g., next cycle period 226), and one future instance 222 is rescheduled to fourth next cycle interval 224D, which occurs between 12:03 AM and 12:04 AM the following week. As illustrated, third next cycle interval 224C, currently has (1+2=) three future instances 222 scheduled and fourth next cycle interval 224D currently has one future instance 222 scheduled, prior to additional intervals 212 in cycle period 214 being processed upon completion of second interval 212B.

Still referring to FIG. 4, it is understood that different approaches can be used depending on the implementation. For example, in the representative example, it was assumed that the amount of time utilized to process an instance 210 of telemetry data 104 is a fixed value of time 302 of one minute 308. However, as indicated at reference numeral 426, device 200 can determine that intervals 212 differ between different instances 210. In that case, as indicated at reference numeral 428, device 200 can implement using computation units 310 instead of time 302. For example, both intervals 212 and cycle period 214 can be represented in terms of computation units 310. EDV 220 can also be represented in terms of computation units 310.

Likewise, in the representative example, it was assumed that the reporting frequency for a given remote device in transmitting an instance 210 of telemetry data 104 is a fixed value of time 302 of one week 316. However, as indicated at reference numeral 430, device 200 can determine that cycle periods 214 of different remote devices 102 are not the same. In that case, as indicated at reference numeral 432, device 200 can implement a technique that operates to prioritize certain instances 210 over others. In that regard, device 200 can reduce or increase offset amount 236 by a fraction 434 of interval 212. Hence, if a given offset amount 236 is one minute, such can be changed, say by several seconds (e.g., fraction 434). Such can be used to set schedule time 234 to be at or near the beginning of next interval 224 and/or to be at or new the end of next interval 224.

Such can operate to facilitate the arrival of certain instances 210 to be moved up or down within a given interval 210, which can effectively establish a form of priority within that interval 210, since instances 210 that arrive first will be processed while count 218 is low. Therefore, those early arriving instances 210 are more likely not to be rescheduled by offset amount 236.

In that regard, remote devices 102 in which the cycle period 214 is more frequent can be given priority over remotes devices 102 having a less frequent cycle period 214. To illustrate. Suppose two instances 210A, 210B from two different remote devices 102A, 102B arrive near the midpoint of an interval 212, for example at 12:00.30 (e.g., thirty seconds after the beginning of, and thirty seconds until the end of, interval 212). Remote device 102A has a cycle period 214A that is one day 314, whereas remote device 102B has a cycle period 214B that is one week 316.

Hence, instances 210 from remote device 102A can be prioritized over instances 210 from remote device 102B by reducing schedule time 234 and/or offset time 236 (including zero offsets) by up to about thirty seconds (e.g., fraction 434). In other words, instead of arriving at the approximate midpoint of next interval 224, the future instance 222 of remote device 102A can arrive closer to the beginning of next interval 224. Additionally or alternatively, instances 210 from remote device 102B can have their effective priority reduced over instances 210 from other devices 102 by adding fraction 434 to schedule time 234 and/or offset time 236. In other words, instead of arriving at the approximate midpoint of next interval 224, the future instance 222 of remote device 102B can arrive closer to the end of next interval 224.

At reference numeral 436, device 200, or another suitable device, can train a machine learning process for determining various parameters detailed herein such as, for example, interval 212, cycle period 214, EDV 220, and so on.

Figure 6:
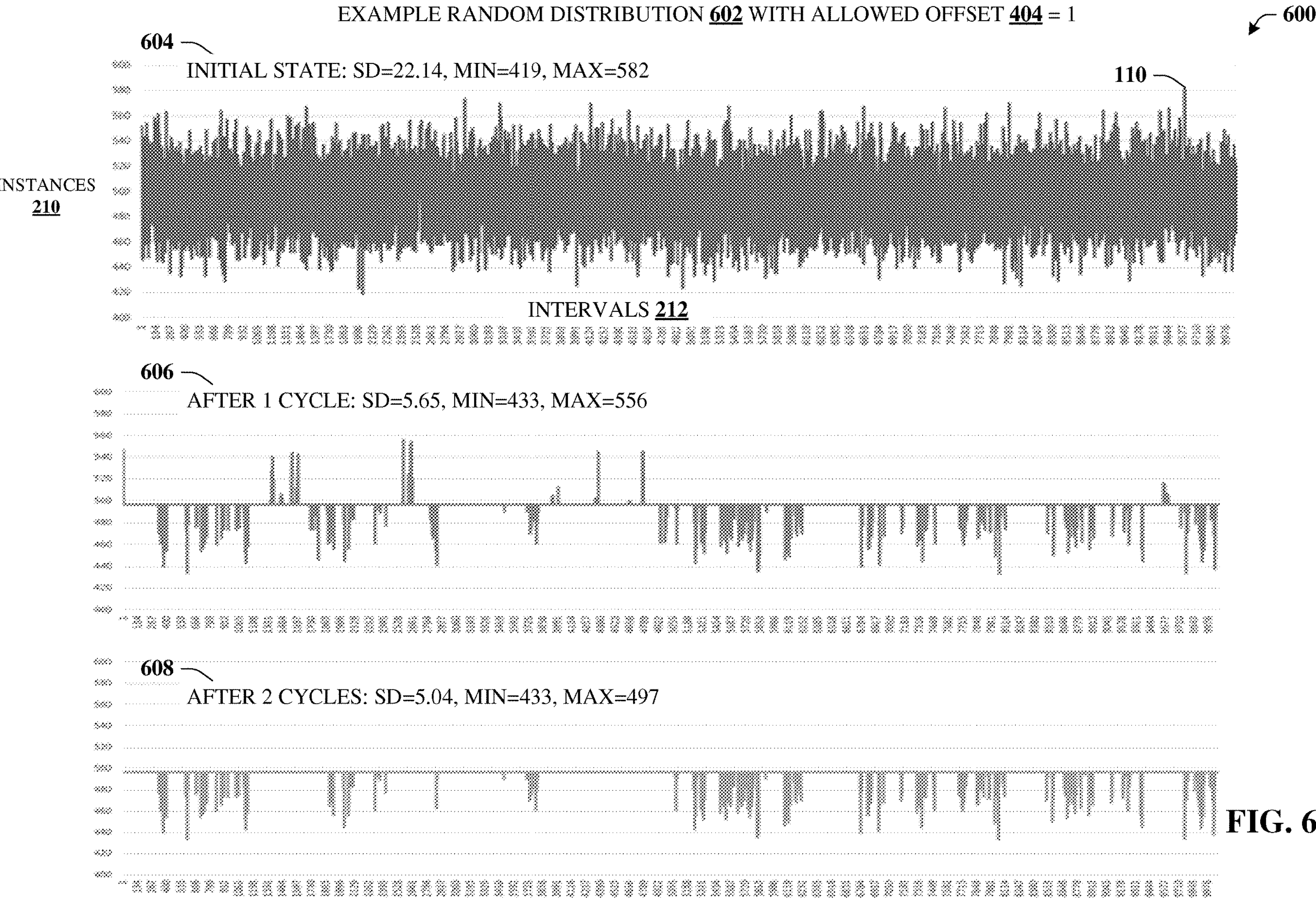
FIG. 6 depicts a graphical diagram illustrating an example random distribution of the telemetry data and iterative effects of applying the redistribution process over multiple cycle periods in accordance with certain embodiments of this disclosure.

With reference now to FIG. 6, a graphical diagram 600 is depicted illustrating an example random distribution of telemetry data 104 and iterative effects of applying the redistribution process over multiple cycle periods in accordance with certain embodiments of this disclosure. As indicated, this example assumes telemetry data 104 is received by telemetry system 106 according to a random distribution 602. Telemetry data 104 is plotted as a number of instances 210 (e.g., y-axis) per intervals 212 (e.g., x-axis). In this case, intervals 212 are again implemented as one minute and the cycle period 214 is one week, meaning an entire cycle period 214 can have 10,080 intervals 212. Here, the allowed offset 404 is limited to only a single minute.

While a random distribution 602 is considered to be a best case scenario for telemetry data 104 that has not been redistributed by the disclosed techniques, traffic spikes 110 can still occur. In this example, several million instances 210 of telemetry data 104 can be received over the cycle period 214. It can be observed that the initial state 604 (e.g., any before redistribution/rescheduling) of instances 210 of telemetry data 104 have a standard deviation (SD) of 22.14, a minimum of 419 and a maximum of 582. Therefore, to ensure that telemetry data 104 is not lost or otherwise compromised, server and network resources must be structured to handle at least the maximum value of 582 instances 210 per minute.

As can be observed, the distribution plot 606 after one cycle has an SD of only 5.65. Minimum and maximum values are respectively, 433 and 556. The distribution plot 608 after two cycles has a further improved SD of 5.04, with minimum and maximum values logging 433 and 497, respectively. Typically, even with the significant constraint of the allowed offset 404 being limited to one, a substantially optimal distribution can be achieved in as few as three or four cycles. Such can significantly reduce the computational and network resources allocated to account for traffic spikes 110, since the disclosed techniques effectively reduce or eliminate traffic spikes 110.

Figure 7:
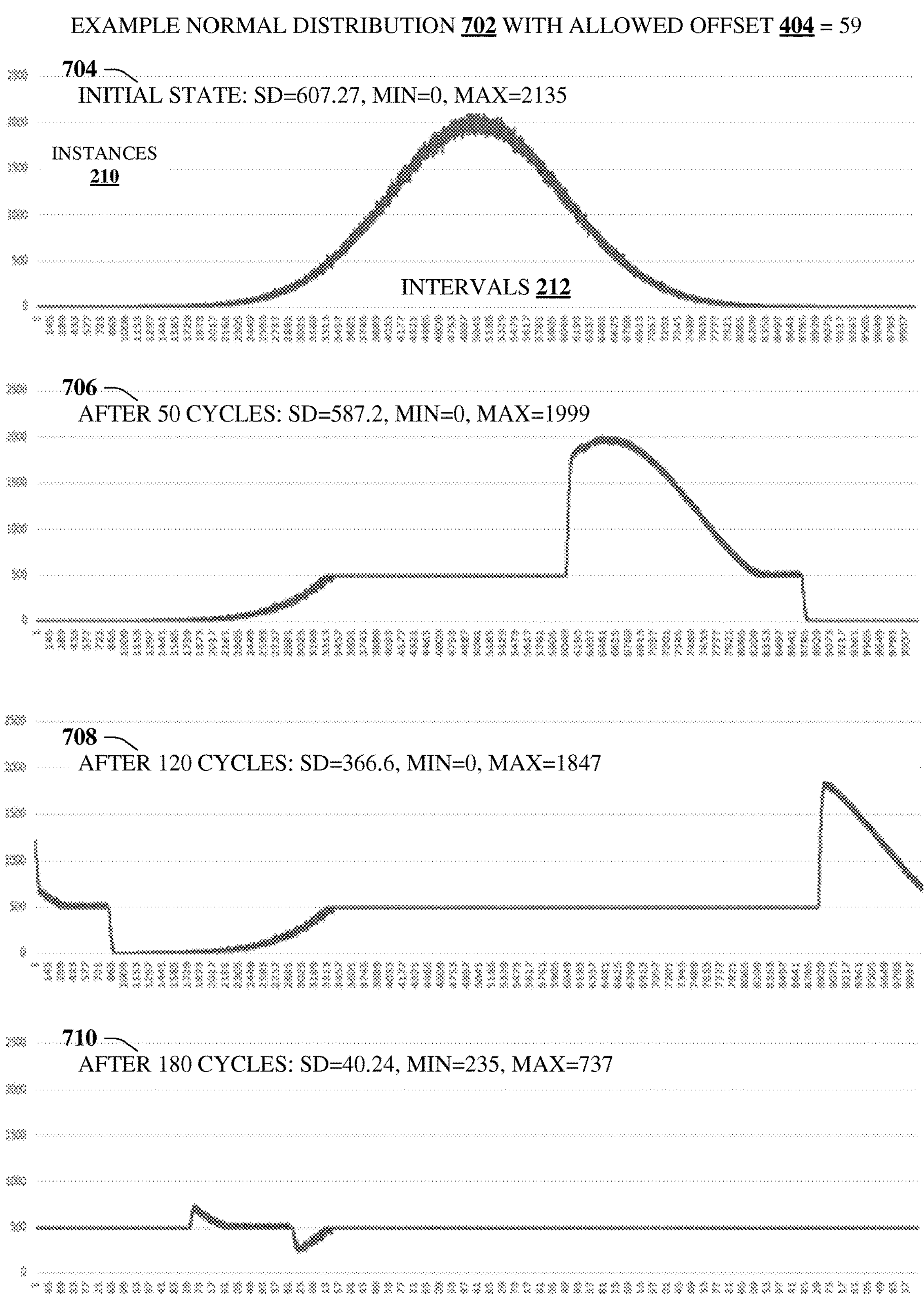
FIG. 7 shows a graphical diagram illustrating an example normal distribution of the telemetry data and iterative effects of applying the redistribution process over multiple cycle periods in accordance with certain embodiments of this disclosure.

With reference now to FIG. 7, a graphical diagram 700 is depicted illustrating an example normal distribution of telemetry data 104 and iterative effects of applying the redistribution process over multiple cycle periods in accordance with certain embodiments of this disclosure. As indicated, this example assumes telemetry data 104 is received by telemetry system 106 according to a normal distribution 702. Telemetry data 104 is plotted as a number of instances 210 (e.g., y-axis) per intervals 212 (e.g., x-axis). In this case, intervals 212 are again implemented as one minute and the cycle period 214 is one week, meaning an entire cycle period 214 can have 10,080 intervals 212. Here, the allowed offset 404 is limited to 59 minutes.

In contrast to random distribution 602, normal distribution 702 is considered to be a worst case scenario. It is expected that actual traffic flows associated with telemetry data 104 will typically be closer to random distribution 602, but may have features of normal distribution 702 such as when remote devices 102 are frequently installed or configured at similar times. It can be observed that the initial state 704 (e.g., any before redistribution/rescheduling) of instances 210 of telemetry data 104 have an SD of 607.27, a minimum of 0, and a maximum of 2135. Therefore, to ensure that telemetry data 104 is not lost or otherwise compromised, server and network resources must be structured to handle at least the maximum value of 2135 instances 210 per minute.

As can be observed, the distribution plot 706 after 50 cycles has an SD of 587.2, which is still quite high, but significantly reduced over the initial state 704. Minimum and maximum values are respectively, 0 and 1999. The distribution plot 708 after 120 cycles has further improved the SD to 366.6, with minimum and maximum values illustrated as 0 and 1847, respectively. The distribution plot 710 after 180 cycles has dramatically improved the SD to 40.24, with minimum and maximum values illustrated as 235 and 737, respectively. Therefore, even when starting with the worst case scenario of a normal distribution 702, the redistribution techniques can be significantly improved and/or substantially optimized after about 180 cycles when the allowed offset data 404 prevents redistributing future instances 222 to more than 59 minutes away from the initial instance 212 time slot.

It is understood that the speed with which a substantially optimal distribution is obtained significantly depends on the state of the initial traffic flow distribution and the allowed offset data 404. As detailed above, the state of the initial traffic flow distribution can potentially range from random distribution 602 to normal distribution 702. In the case of a random distribution 602, the traffic flow distribution of telemetry data 14 can be substantially optimized in as few as three to four cycles, regardless of any constraint incurred from allowed offset data 404. For a normal distribution 702, the number of cycles to obtain the substantially optimal traffic flow distribution can be heavily influenced by allowed offset data 404, as illustrated in Table I, below.

TABLE I

| | Cycle Count to Achieve Substantially Optimal Redistribution | |
|---|---|---|
| Allowed Offset | Initial Sample Distribution: Random | Initial Sample Distribution: Normal Distribution |
| 1 min | 3-4 | >5000 |
| 3 min | | ~2800 |
| 11 min | | ~950 |
| 29 min | | ~370 |
| 59 min | | ~180 |
| 89 min | | ~120 |
| 119 min | | ~90 |

As can be observed from Table I, for normal distribution 702, when allowed offset data 404 is limited to one minute, substantially optimal distribution may not be obtained until more than 5000 cycle iterations. However, when the allowed offset data 404 is 119 minutes, substantially optimal distribution may be obtained after only about 90 cycle iterations.

Figure 8:
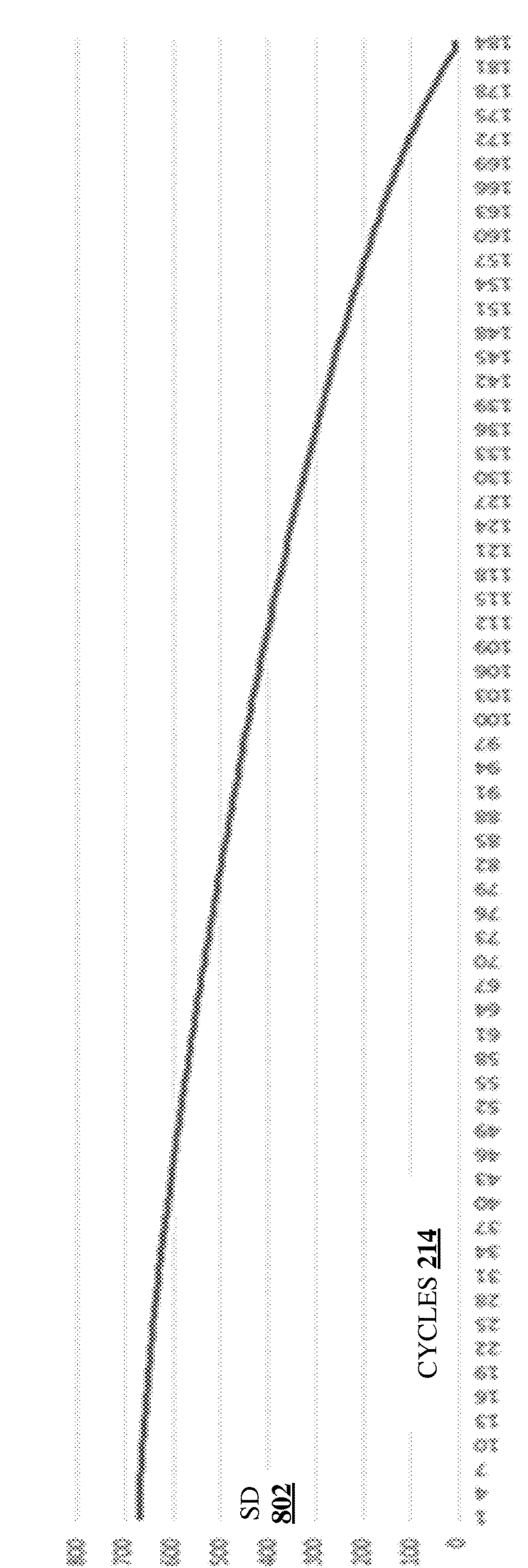
FIG. 8 shows a graphical diagram illustrating a gradual decline in the standard deviation after each cycle in accordance with certain embodiments of this disclosure.

Referring now to FIG. 8, a graphical diagram 800 is depicted illustrating a gradual decline in standard deviation 802 after each cycle 214 in accordance with certain embodiments of this disclosure.

Graphical diagram 800 plots SD 802 (y-axis) over cycles 214 (x-axis) for the example provided in connection with FIG. 7. In that case, the initial state 704 was a normal distribution 702, which is considered a worst case scenario. The allowed offset data 404 indicated a constraint of 59 minutes. As shown in diagram 800, after about 180 cycles 214, SD 802 approaches zero, which would indicate an optimized and/or evenly distributed traffic flow of telemetry data 104.

Example Methods

Figure 9:
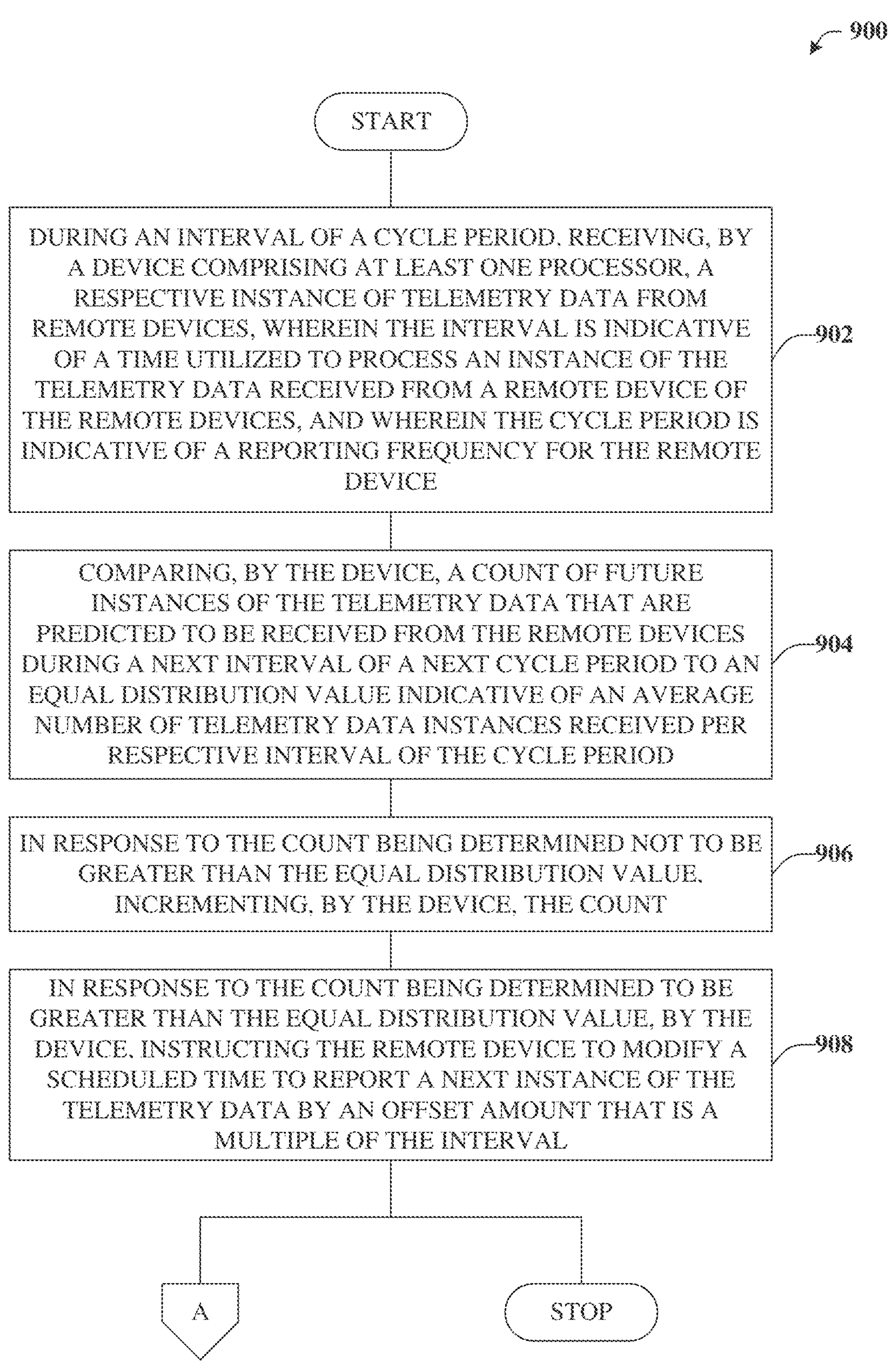
FIG. 9 illustrates an example method that can dynamically offset telemetry instances to reduce telemetry traffic spikes in accordance with certain embodiments of this disclosure.
Figure 10:
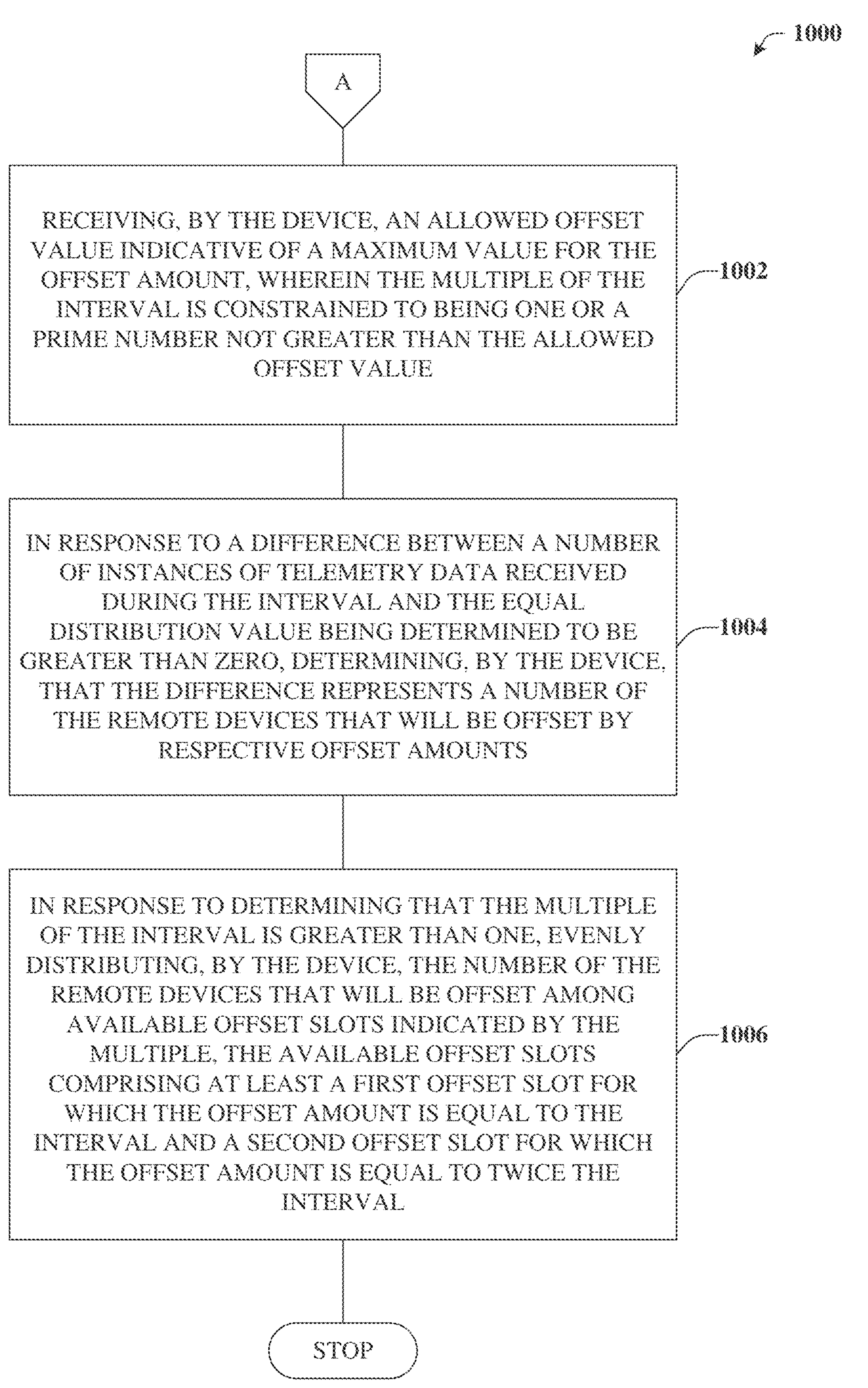
FIG. 10 illustrates an example method that can provide for additional elements or functionality relating to dynamically offsetting telemetry instances to reduce telemetry traffic spikes in accordance with certain embodiments of this disclosure.

FIGS. 9 and 10 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 9, exemplary method 900 is depicted. Method 900 can dynamically offset telemetry instances to reduce telemetry traffic spikes in accordance with certain embodiments of this disclosure. While method 900 describes a complete method, in some embodiments, method 900 can include one or more elements of method 1000, reached via insert A, as discussed at FIG. 10.

At reference numeral 902, during an interval of a cycle period, a device comprising at least one processor can receive a respective instance of telemetry data from remote devices that report during the interval of the cycle period. The interval can be indicative of a time utilized to process an instance of the telemetry data received from a remote device of the remote devices. The cycle period can be indicative of a reporting frequency for the remote device. For example, the elapsed time between reporting sequential instances of telemetry data 104 by the remote device.

At reference numeral 904, the device can determine a count of future instances of the telemetry data that are predicted (e.g., scheduled) to be received from the remote devices during a next interval of a next cycle period. This count can be compared to an equal distribution value indicative of an average number of telemetry data instances received per respective interval of the cycle period.

At reference numeral 906, in response to the count being determined not to be greater than the equal distribution value, the device can increment the count by one. Such can reflect the fact that the schedule time for reporting a future instance of telemetry data need not be offset.

At reference numeral 908, in response to the count being determined to be greater than the equal distribution value, instructing, by the device, the remote device to modify a scheduled time to report a next instance of the telemetry data by an offset amount that is a multiple of the interval. Method 900 can terminate in some embodiments, or proceed to insert A in other embodiments, which is further detailed in connection with FIG. 10.

Turning now to FIG. 10, exemplary method 1000 is depicted. Method 1000 can provide for additional elements or functionality relating to dynamically offsetting telemetry instances to reduce telemetry traffic spikes in accordance with certain embodiments of this disclosure.

For example, at reference numeral 1002, the device introduced in connection with FIG. 9 can receive an allowed offset value. The allowed offset value can be indicative of a maximum value for the offset amount. As indicated at reference numeral 908 of FIG. 9, the offset amount can be a multiple of the interval. This multiple of the interval can be constrained to being one or a prime number not greater than the allowed offset value.

A reference numeral 1004, in response to a difference between a number of instances of telemetry data received during the interval and the equal distribution value being determined to be greater than zero, the device can determine that the difference represents a number of the remote devices that will be offset by respective offset amounts.

A reference numeral 1006, in response in response to determining that the multiple of the interval is greater than one, the device can evenly distribute the number of the remote devices that will be offset among available offset slots indicated by the multiple. The available offset slots can comprise at least a first offset slot for which the offset amount is equal to the interval (e.g., the offset to a next sequential interval within a given cycle period) and a second offset slot for which the offset amount is equal to twice the interval (e.g., the offset is two intervals within a given cycle period).

Example Operating Environments

Figure 11:
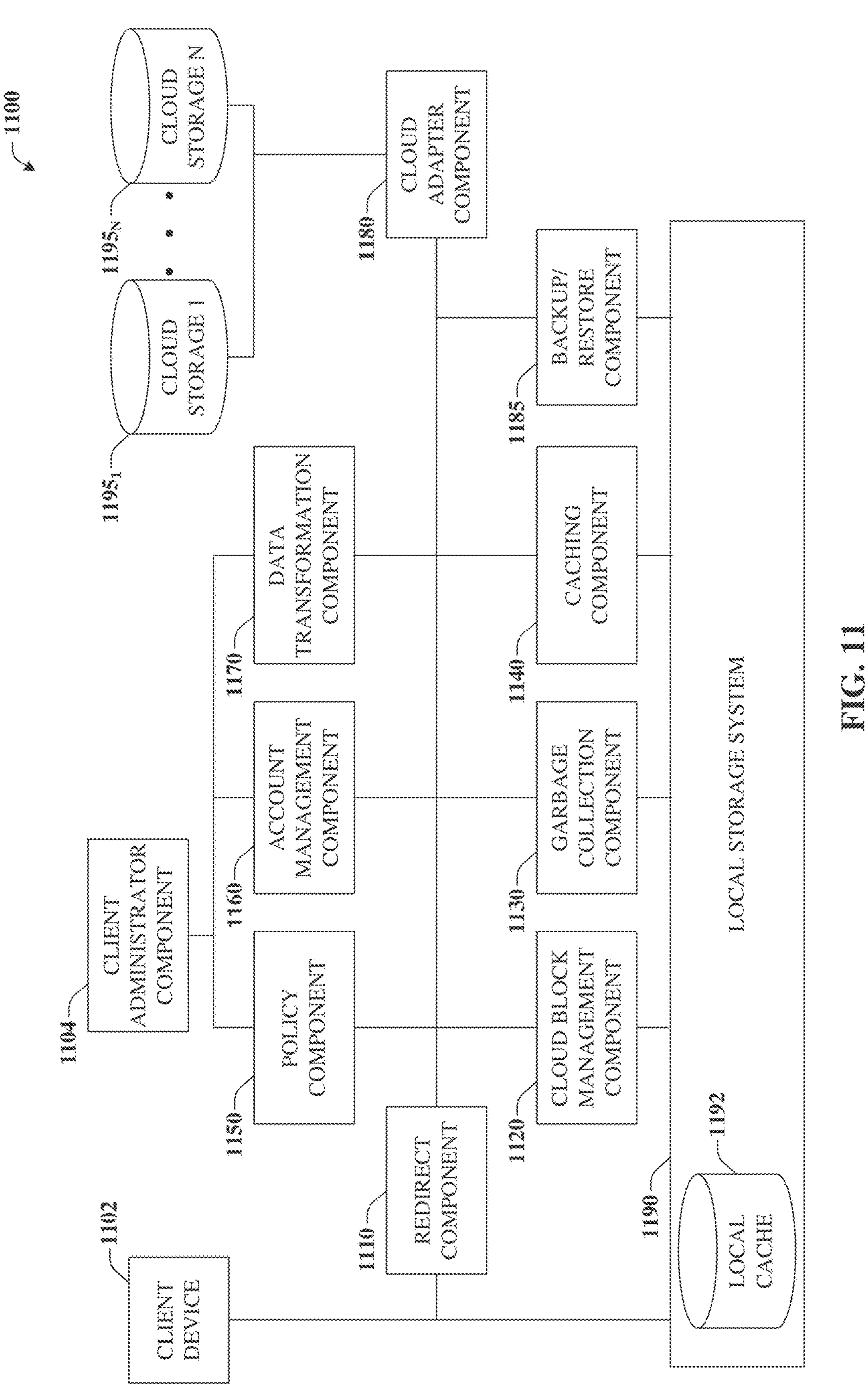
FIG. 11 illustrates a block diagram of an example distributed file storage system that employs tiered cloud storage in accordance with certain embodiments of this disclosure.
Figure 12:
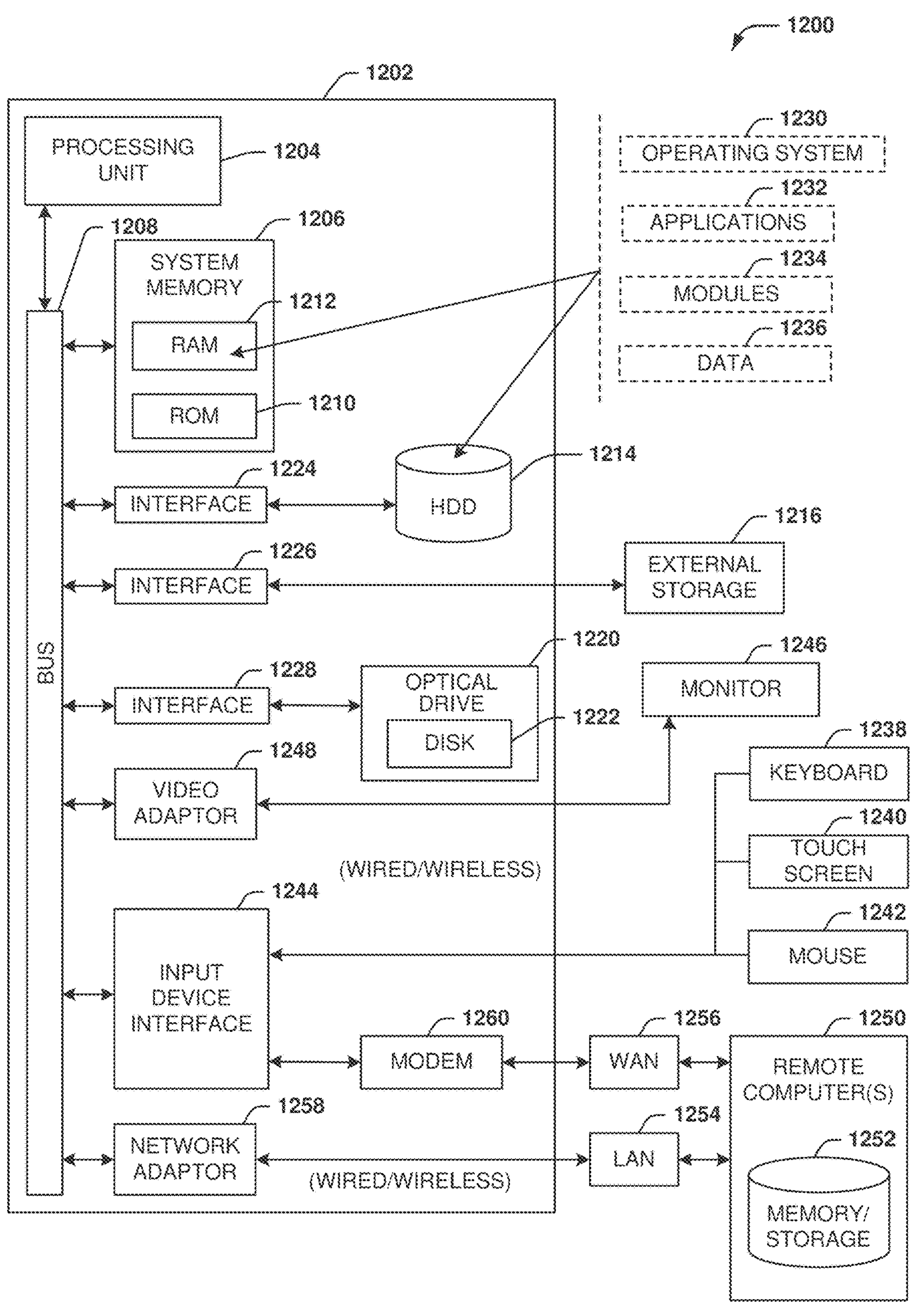
FIG. 12 illustrates an example block diagram of a computer operable to execute certain embodiments of this disclosure.

To provide further context for various example embodiments of the subject specification, FIGS. 11 and 12 illustrate, respectively, a block diagram of an example distributed file storage system 1100 that employs tiered cloud storage and block diagram of a computer 1202 operable to execute the disclosed storage architecture in accordance with example embodiments described herein.

Referring now to FIG. 11, there is illustrated an example local storage system including cloud tiering components and a cloud storage location in accordance with implementations of this disclosure. Client device 1102 can access local storage system 1190. Local storage system 1190 can be a node and cluster storage system such as an EMC Isilon Cluster that operates under OneFS operating system. Local storage system 1190 can also store the local cache 1192 for access by other components. It can be appreciated that the systems and methods described herein can run in tandem with other local storage systems as well.

As more fully described below with respect to redirect component 1110, redirect component 1110 can intercept operations directed to stub files. Cloud block management component 1120, garbage collection component 1130, and caching component 1140 may also be in communication with local storage system 1190 directly as depicted in FIG. 11 or through redirect component 1110. A client administrator component 1104 may use an interface to access the policy component 1150 and the account management component 1160 for operations as more fully described below with respect to these components. Data transformation component 1170 can operate to provide encryption and compression to files tiered to cloud storage. Cloud adapter component 1180 can be in communication with cloud storage 1 $1195_1$ and cloud storage N $1195_N$, where N is a positive integer. It can be appreciated that multiple cloud storage locations can be used for storage including multiple accounts within a single cloud storage location as more fully described in implementations of this disclosure. Further, a backup/restore component 1185 can be utilized to back up the files stored within the local storage system 1190.

Cloud block management component 1120 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1120 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1160 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1120 based on a list of mappings that the cloud block management component 1120 manages. For example, each stub can be associated with an account, and the cloud block management component 1120 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1180 manages the sending and receiving of data to and from the cloud service providers. The cloud adapter component 1180 can utilize a set of APIs. For example, each cloud service provider may have provider specific API to interact with the provider.

A policy component 1150 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1130. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1130 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1140 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1120, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1140 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1140 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that the file has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time the stub file is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1170 can encrypt and/or compress data that is tiered to cloud storage. In relation to encryption, it can be appreciated that when data is stored in off-premises cloud storage and/or public cloud storage, users can request or require data encryption to ensure data is not disclosed to an illegitimate third party. In one implementation, data can be encrypted locally before storing/writing the data to cloud storage.

In one implementation, the backup/restore component 1185 can transfer a copy of the files within the local storage system 1190 to another cluster (e.g., target cluster). Further, the backup/restore component 1185 can manage synchronization between the local storage system 1190 and the other cluster, such that, the other cluster is timely updated with new and/or modified content within the local storage system 1190.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various example embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an example embodiment, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more example embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:

at least one processor; and at least one memory that stores executable instructions that, when executed by the at least one processor, facilitate performance of operations, comprising:

receiving, from each of remote devices, an instance of telemetry data associated with an interval of a cycle period, wherein the interval is indicative of a time utilized to process the instance of the telemetry data received from a remote device of the remote devices, and wherein the cycle period is indicative of a reporting frequency for the remote device;

comparing a count of future instances, of the telemetry data that are scheduled to be received from the remote devices during a next interval of a next cycle period after the cycle period, to an equal distribution value indicative of an average number of telemetry data instances received per respective interval of the cycle period;

in response to the count being determined to be less than the equal distribution value, incrementing the count; and in response to the count being determined not to be less than the equal distribution value, instructing the remote device to modify a scheduled time to report a next instance of the telemetry data by an offset amount that is a function of a multiple of the interval.

2. The device of claim 1, wherein the cycle period is at least one of an hour, a day, or a week, and comprises multiple intervals, comprising the interval, that are at least one of a second, thirty seconds, a minute, or two minutes.

3. The device of claim 1, wherein the operations further comprise receiving an allowed offset value indicative of a maximum value for the offset amount.

4. The device of claim 3, wherein the multiple of the interval is constrained to being one or a prime number not greater than the allowed offset value.

5. The device of claim 1, wherein the operations further comprise, in response to a difference between a number of the telemetry data instances received during the interval and the equal distribution value being determined to be greater than zero, determining that the difference represents a number of the remote devices that are to be offset by respective offset amounts.

6. The device of claim 5, wherein the operations further comprise, in response to determining that the multiple of the interval is greater than one, evenly distributing the number of the remote devices that are to be offset among available offset slots indicated by the multiple of the interval, the available offset slots comprising at least a first offset slot for which the offset amount is equal to the interval and a second offset slot for which the offset amount is equal to twice the interval.

7. The device of claim 1, wherein the interval is a first interval and the remote device is a first remote device, and wherein the operations further comprise, in response to determining that the first interval differs from a second interval associated with a second remote device of the remote devices, determining a number of computation resource circuits utilized to process the telemetry data over the cycle period and updating the equal distribution value to be indicative of an average number of the computation resource circuits per the first interval.

8. The device of claim 1, wherein the interval is a first interval, the cycle period is a first cycle period, the next instance is a first next instance, and the remote device is a first remote device, and wherein the operations further comprise, in response to determining that the first cycle period is greater than a second cycle period associated with a second remote device of the remote devices, reducing the offset amount by a fraction of a second interval associated with the second remote device, as a result of which a second next instance associated with the second remote device is scheduled to be transmitted or received at a beginning of the second next instance.

9. The device of claim 1, wherein the interval is a first interval, the cycle period is a first cycle period, the next instance is a first next instance, and the remote device is a first remote device, and wherein the operations further comprise, in response to determining that the first cycle period is less than a second cycle period associated with a second remote device of the remote devices, increasing the offset amount by a fraction of a second interval associated with the second remote device, as a result of which a second next instance associated with the second remote device is scheduled to be transmitted or received at an end of the second next instance.

10. The device of claim 1, wherein the operations further comprise, based on historical telemetry data received over at least a previous cycle period prior to the cycle period and received from the remote devices that reported in a previous interval of the at least previous cycle period and other remote devices that reported in other previous intervals of the at least previous cycle period, using an output of a machine learning process trained to determine the cycle period and the interval.

11. A method, comprising:

during an interval of a cycle period, receiving, by a device comprising at least one processor, an instance of telemetry data from each of remote devices, wherein the interval is indicative of a time utilized to process the instance of the telemetry data received from a remote device of the remote devices, and wherein the cycle period is indicative of a reporting frequency for the remote device;

comparing, by the device, a count of future instances of the telemetry data that are predicted to be received from the remote devices during a next interval of a next cycle period to an equal distribution value indicative of an average number of telemetry data instances received per respective interval of the cycle period;

in response to the count being determined not to be greater than the equal distribution value, incrementing, by the device, the count; and in response to the count being determined to be greater than the equal distribution value, instructing, by the device, the remote device to modify a scheduled time to report a next instance of the telemetry data by an offset amount that is a multiple of the interval.

12. The method of claim 11, further comprising, receiving, by the device, an allowed offset value indicative of a maximum value for the offset amount, wherein the multiple of the interval is constrained to being one or a prime number not greater than the allowed offset value.

13. The method of claim 11, further comprising, in response to a difference between a number of the telemetry data instances received during the interval and the equal distribution value being determined to be greater than zero, determining, by the device, that the difference represents a number of the remote devices that will be offset by respective offset amounts.

14. The method of claim 11, further comprising, in response to determining that the multiple of the interval is greater than one, evenly distributing, by the device, the number of the remote devices that will be offset among available offset slots indicated by the multiple of the interval, the available offset slots comprising at least a first offset slot for which the offset amount is equal to the interval and a second offset slot for which the offset amount is equal to twice the interval.

15. A non-transitory machine-readable medium, comprising executable instructions that, when executed by at least one processor, facilitate performance of operations, comprising:

receiving, from each of remote devices, an instance of telemetry data associated with an interval of a cycle period, wherein the interval is indicative of a time utilized to process the instance of the telemetry data received from a remote device of the remote devices, and wherein the cycle period is indicative of a reporting frequency for the remote device;

comparing a count of future instances, of the telemetry data that are scheduled to be received from the remote devices during a next interval of a next cycle period after the cycle period, to an equal distribution value indicative of an average number of telemetry data instances received per respective interval of the cycle period;

in response to the count being determined to be less than the equal distribution value, incrementing the count; and in response to the count being determined not to be less than the equal distribution value, instructing the remote device to modify a scheduled time to report a next instance of the telemetry data by an offset amount that is a function of a multiple of the interval.

16. The non-transitory machine-readable medium of claim 15, wherein the cycle period is at least one of an hour, a day, or a week, and comprises multiple intervals, comprising the interval, that are at least one of a second, thirty seconds, a minute, or two minutes.

17. The non-transitory machine-readable medium of claim 15, wherein the operations further comprise receiving an allowed offset value indicative of a maximum value for the offset amount, and wherein the multiple of the interval is constrained to being one or a prime number not greater than the allowed offset value.

18. The non-transitory machine-readable medium of claim 15, wherein the operations further comprise:

in response to a difference between a number of the telemetry data instances received during the interval and the equal distribution value being determined to be greater than zero, determining that the difference represents a number of the remote devices that are to be offset by respective offset amounts, and in response to determining that the multiple of the interval is greater than one, evenly distributing the number of the remote devices that are to be offset among available offset slots indicated by the multiple of the interval, the available offset slots comprising at least a first offset slot for which the offset amount is equal to the interval and a second offset slot for which the offset amount is equal to twice the interval.

19. The non-transitory machine-readable medium of claim 15, wherein the interval is a first interval and the remote device is a first remote device, and wherein the operations further comprise, in response to determining that the first interval differs from a second interval associated with a second remote device of the remote devices, determining a number of computation resource circuits utilized to process the telemetry data over the cycle period and updating the equal distribution value to be indicative of an average number of the computation resource circuits per the first interval.

20. The non-transitory machine-readable medium of claim 15, wherein the operations further comprise, based on historical telemetry data received over at least a previous cycle period prior to the cycle period and received from the remote devices that reported in a previous interval of the at least previous cycle period and other remote devices that reported in other previous intervals of the at least previous cycle period, using an output of a machine learning process trained to determine the cycle period and the interval.

* * * * *